United States Patent [19]
Futami et al.

[11] Patent Number: 5,090,946
[45] Date of Patent: Feb. 25, 1992

[54] TENSIONER WITH REPLACEABLE FILTER IN OIL PATH

[75] Inventors: Yuichi Futami, Iruma; Yuji Nagami, Hanno, both of Japan

[73] Assignee: Tsubakimoto Chain Co., Osaki, Japan

[21] Appl. No.: 609,515

[22] Filed: Nov. 6, 1990

[30] Foreign Application Priority Data

Nov. 6, 1989 [JP] Japan .................. 1-129088

[51] Int. Cl.⁵ .............................................. F16H 7/22
[52] U.S. Cl. ...................................... 474/104; 474/110
[58] Field of Search ........................ 474/110, 103, 104

[56] References Cited

U.S. PATENT DOCUMENTS

| | | | |
|---|---|---|---|
| 4,048,866 | 9/1977 | Weirich et al. | 474/101 X |
| 4,190,025 | 2/1980 | Wahl | 123/90.38 X |
| 4,276,038 | 6/1981 | Kraft | 474/110 |
| 4,299,583 | 11/1981 | Kraft et al. | 474/110 |
| 4,543,079 | 9/1985 | Matsuda et al. | 474/110 X |
| 4,575,364 | 3/1986 | Lamers | 474/28 X |

Primary Examiner—Ramon S. Britts
Assistant Examiner—Roger J. Schoeppel
Attorney, Agent, or Firm—Howson & Howson

[57] ABSTRACT

A fluid tensioner for use with power transmission chains such as automotive camshaft drive chains users engine lubricating oil as its operating fluid, and includes a built-in oil filter for removing foreign matter which might interfere with proper tensioner operation. The tensioner is attached directly to the outside wall of an engine block and, in one version the filter is disposed in an elongated recess formed in the portion of the tensioner housing which engages the engine block, and engine oil is received through an oil port in the block. The filter screen is tilted to maximize the distance between the oil port and the screen and between the screen and the channel in the tensioner through which oil flows to the tensioner mechanism. In another version, the tensioner has a built-in oil reservoir, and the filter is located either upstream or downstream from the reservoir and insertable through a passage leading to the outside of the tensioner housing for easy inspection and replacement.

20 Claims, 4 Drawing Sheets

TENSIONER WITH REPLACEABLE FILTER IN OIL PATH

BRIEF SUMMARY OF THE INVENTION

This invention relates to tensioners, and in particular to improvements in "oil tensioners" of the kind used to maintain tension, or to eliminate excessive slack, in chains, belts or like power transmission mechanisms, for example chains used to drive valve-operating camshafts in automobile and truck engines.

The primary purpose of a tensioner of the type to which this invention relates, is to prevent skipping of a chain on sprocket teeth, or slippage of a power transmission belt.

In an oil tensioner, tension is maintained in a chain or belt by a piston which slides in a cylinder containing oil. Oil enters the cylinder through a check valve which allows the piston to move readily in the tension-applying direction, but which prevents the piston from moving rapidly in the opposite direction. The engine lubricating system is a convenient source of oil for the tensioner. Thus a supply of engine lubricating oil can be derived from the engine block for use in the tensioner.

One problem with the use of engine oil in a tensioner is that foreign substances found in the engine block can be admitted into the tensioner, especially when the engine is started for the first time. These foreign substances may comprise metal chips generated in the process of machining an engine block and inadvertently left in the block. They may also comprise dust, abrasives, or other undesired substances. When these foreign substances find their way into the tensioner, they may accumulate in an oil path within the tensioner and obstruct smooth flow of oil. They may also interfere with the operation of the check valve, or produce damage to the piston or its cylinder, thereby interfering with smooth movement of the piston.

The principal object of this invention is to provide an oil tensioner in which foreign substances such as chips and dust are effectively removed from the oil entering the tensioner. It is also an object of the invention to provide a practical tensioner which is able to take advantage of engine lubricant as its operating fluid. Another object of the invention is to prevent such foreign substances from obstructing flow of oil within the tensioner. It is also an object of the invention to prevent foreign substances from impeding smooth operation of the tensioner and from causing damage to its components.

In accordance with the invention, there is provided an oil tensioner comprising a piston accommodated in a cylinder filled with oil which flows into and out of the cylinder, a check valve mechanism controlling the flow of oil so that it flows more readily in one direction than in the other, and a removable oil filter provided in an oil path along which the oil flows. An oil filter-receiving chamber is built into the housing.

When oil, fed from outside the tensioner is sucked into the cylinder by way of the check valve mechanism, it passes the oil filter provided in the oil path, and removes foreign substances such as chips or dust, preventing them from reaching the moving parts of the tensioner. Consequently, the foreign substances will not enter into the check valve mechanism, into the clearance between the piston and cylinder, or into the orifice through which oil returns when the piston retracts. Consequently a smooth flow of oil is achieved, and damage to the piston and cylinder is avoided, with a resultant smoother movement of the piston and smoother operation of the tensioner over a longer period of time.

Preferably, the tensioner comprises a housing having a cylindrical bore and a piston slidable in the bore. The piston and cylindrical bore provide an expansible chamber capable of containing oil. Passage means in said housing provide for the flow of oil in a first direction into the expansible chamber and in a second direction out of the expansible chamber. Check valve means associated with the passage means, control flow of oil in the passage means in at least one of the first and second directions, so that the flow of oil takes place in one of said directions at a slower rate than in the other of said directions. The passage means have an oil-receiving opening in communication with the exterior of the housing, and provide for the flow of oil from the exterior of the housing to the expansible chamber. The passage means also include a filter chamber. Oil filter means, located in the filter chamber, prevent foreign particles from passing toward the expansible chamber through the portion of the passage means extending between the filter chamber and the expansible chamber.

Preferably, the oil filter is removable so that it can be removed and cleaned from time to time in order to maintain high filtration efficiency.

Further objects, advantages, details and alternative embodiments of the invention will become apparent from the following detailed description, when read in conjunction with the accompanying drawings.

DETAILED DESCRIPTION

Figure 1:
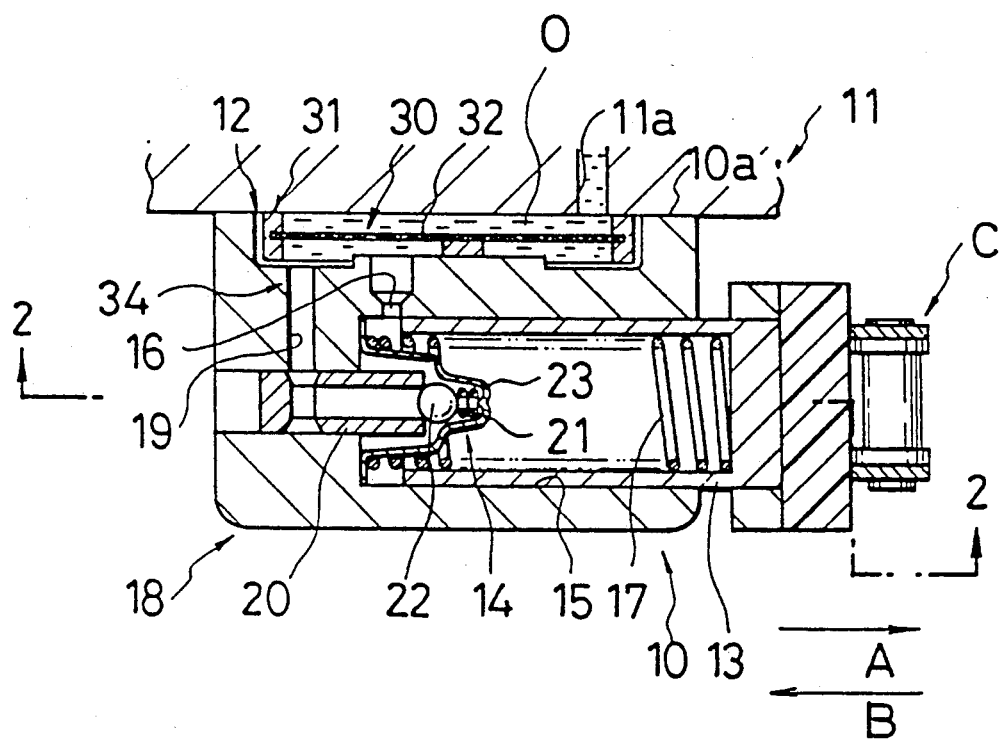
FIG. 1 is a horizontal section of a first embodiment of an oil tensioner in accordance with the invention taken on plane 1—1 of FIG. 2, the figure also showing a portion of an engine block with which the tensioner cooperates.
Figure 2:
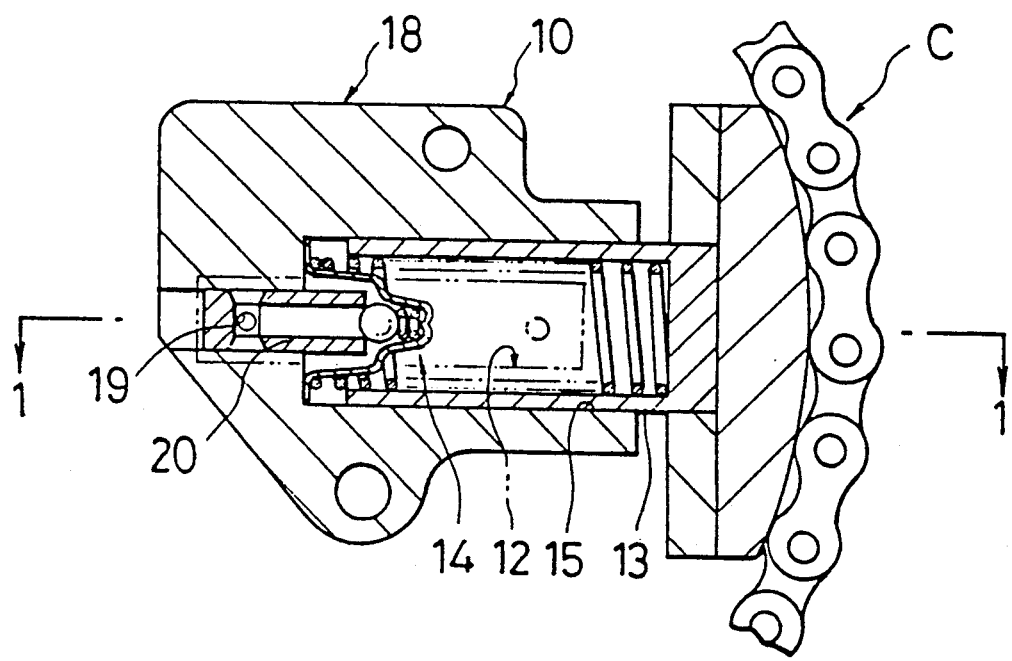
FIG. 2 is a vertical section taken on surface 2—2 of FIG. 1.

As shown in FIGS. 1 and 2, oil tensioner 10 applies tension to a chain C, which may be, for example, a chain for driving the camshaft of an automobile engine. The tensioner 10 is mounted on a wall of the engine block 11. Lubricating oil O, supplied by the engine through port 11a, is introduced into a recess 12 formed in the housing 18 of the tensioner.

A piston 13, which takes up the slack in chain C, is slidable in a cylindrical bore 15 in the tensioner housing. The piston is urged in direction A by a spring 17, in order to tighten chain C.

When the piston moves in direction A upon the occurrence of a slack in the chain, oil is sucked into the expansible chamber formed by the piston and cylindrical bore 15, by way of passage 19 and check valve 14. The check valve comprises a tubular seat 20 force fit in the housing 18, and a ball 22, which is normally held against the seat 20 by the resilient force of a spring 21. The ball and spring are supported by a retainer 23. Oil is returned to the recess 12 by way of a small diameter orifice 16, which leads from the expansible chamber to recess 12. This return flow of oil allows the piston to move slowly in direction B.

A slackening of the chain is quickly taken up by the tensioner, because the check valve 14 allows rapid flow of oil through path 19 to fill the expansible chamber as the piston moves in the projecting direction. However, the narrow orifice 16 prevents any sudden inward movement of the piston which might cause slackening of the chain.

As shown in FIG. 1, side wall 10a of the tensioner is positioned against the wall of the engine block 11, so that the wall of the engine block encloses recess 12, forming an enclosed chamber providing fluid communication between oil supply port 11a on the one hand, and tensioner passage 19 and orifice 16 on the other. It should be noted that recess 12 is elongated, and that port 11a is offset from the openings of passage 19 and orifice 16 in the floor of recess 12.

Figure 3:
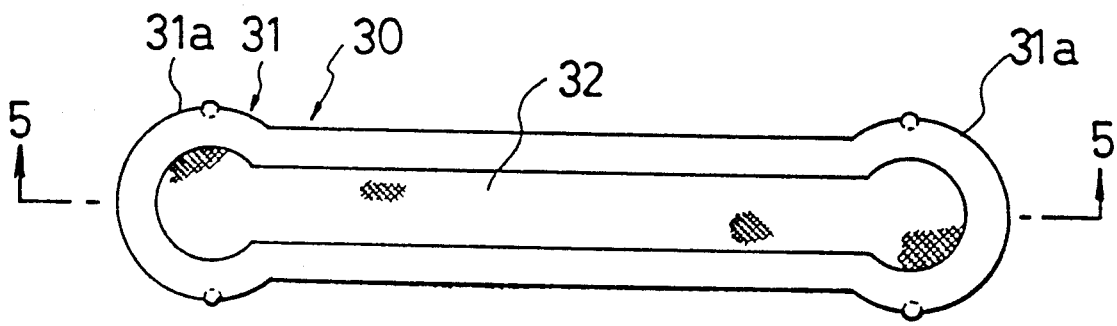
FIG. 3 is a top plan view of the oil filter used in the tensioner of FIG. 1.
Figure 4:
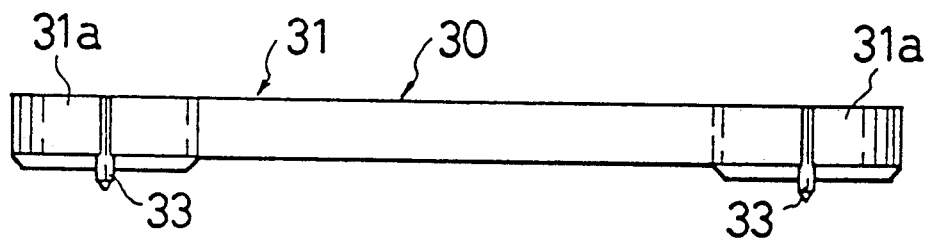
FIG. 4 is a front elevation of the oil filter of FIG. 3.
Figure 5:
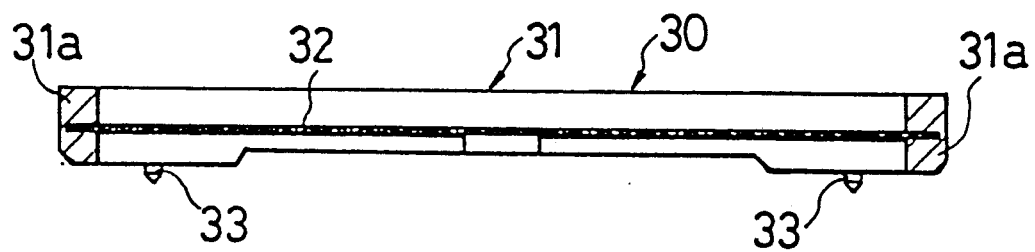
FIG. 5 is a vertical section taken on plane 5—5 of FIG. 3.

An oil filter 30 is removably positioned in recess 12. As shown in FIGS. 3-5, the oil filter comprises a filter body in the form of a frame 31 having arcuate portions 31a at its opposite ends. A small mesh wire gauze or screen 32 is mounted in frame 31. A pair of protrusions 33 is formed on each of the arcuate portions 31a of the frame in order to facilitate force fitting of the frame into a predetermined position within recess 12, as shown in FIG. 1.

In operation of the filter, oil flows along a path 34 from port 11a, through recess 12, and through path 19 and check valve 14, to the expansible chamber defined by cylindrical bore 15 and piston 13. Foreign substances, such as chips and dust which arrive through port 11a are caught by filter screen 32, and prevented from entering path 19. Oil from the expansible chamber is returned through orifice 16 to recess 12. When the filter becomes clogged with foreign substances the tensioner housing can be detached from the wall of the engine block, and the filter can be removed from recess 12 for cleaning or replacement by a new filter.

The opening of port 11a is opposed to the screen 32 near one end of the screen, and the opening of path 19 is opposed to the screen near the opposite end of the screen. By relating the screen to the openings in this manner, a long path is provided for the flow of oil across the face of the filter screen between port 11a and passage 19. The cross-section of the filter is substantially greater than any cross-section in path 19 or seat 20. consequently, the filter has a large effective area, and does not readily become clogged. Replacement of the filter is therefore required only at infrequent intervals.

Figure 6:
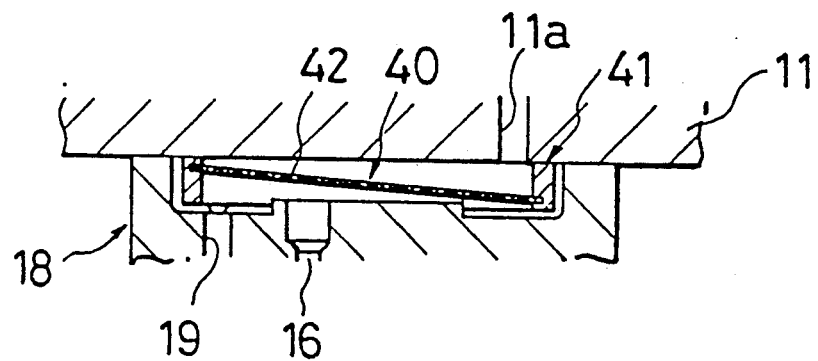
FIG. 6 is a fragmentary horizontal section, corresponding to FIG. 1, showing a modified form of oil filter.

A modified version of the filter is shown in FIG. 6, in which a filter 40 comprises a screen 42 which is supported in a frame 41 in inclined relationship to the wall of engine block 11 and to the floor of the recess in the side of the tensioner housing. The end of the screen opposed to port 11a well spaced from the opening of port 11a, and the end of the screen opposed to the opening of path 19 is also well spaced from the opening of path 19. Preferably, the tilt of the filter screen is such that these spacings are maximized. This arrangement gives rise to a smooth flow of oil through the recess in which the filter is located. Preferably, the portion of the screen opposed to the opening of port 11a is spaced from the floor of the recess by a distance less than the spacing of the floor of the recess from the portion of the screen opposed to the opening of path 19.

More specifically, the screen is disposed so that the portion of the screen opposed to the opening of port 11a is spaced from the wall of engine block 11 by a distance greater than the spacing between that same portion of the screen and the floor of the recess, and the portion of the screen opposed to the opening of path 19 is spaced from the floor of the recess by a distance greater than the spacing of that same portion of the screen from the wall of the engine block 11.

Figure 7:
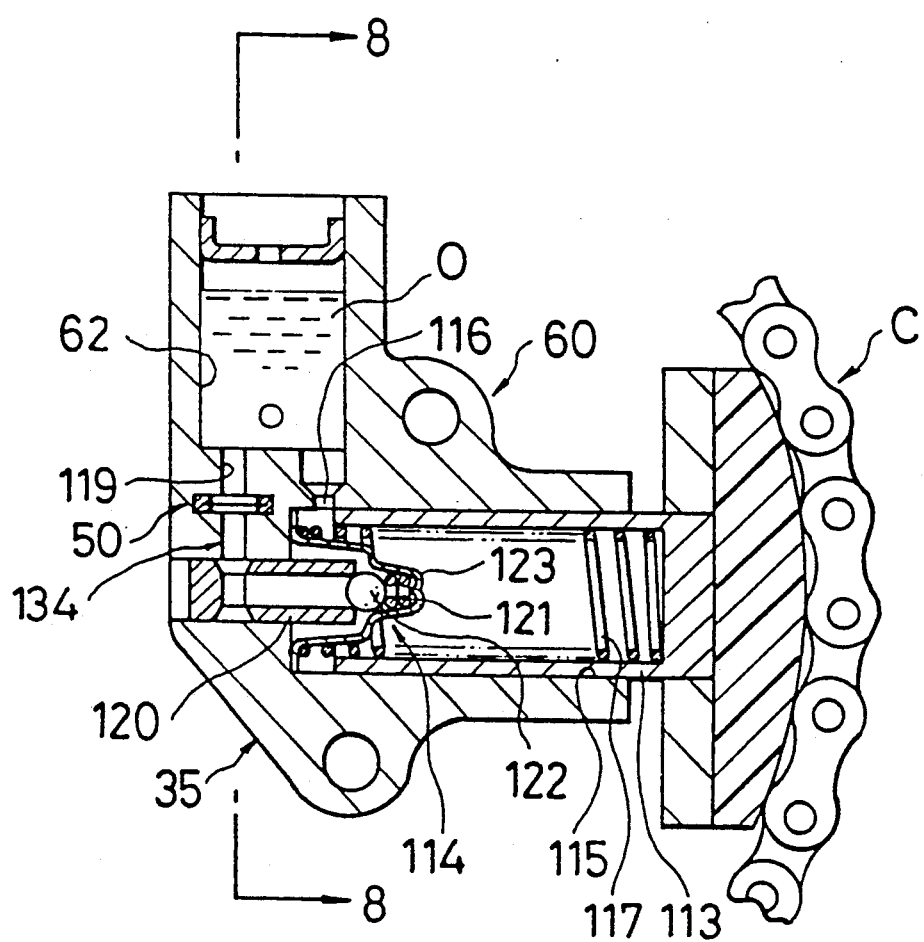
FIG. 7 is a vertical section showing another embodiment of a tensioner in accordance with the invention.
Figure 8:
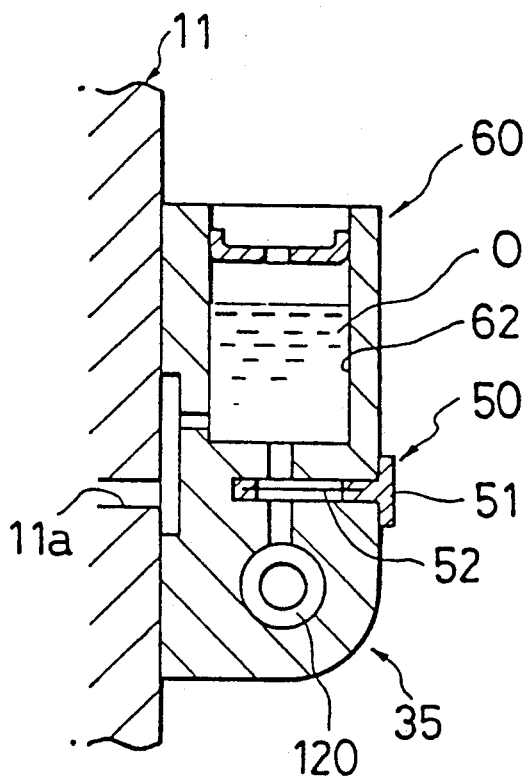
FIG. 8 is a vertical section taken on plane 8—8 of FIG. 7.
Figure 9:
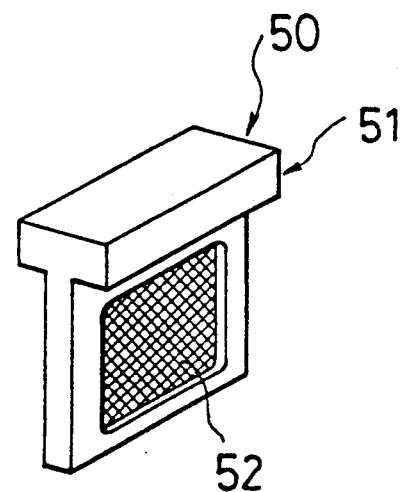
FIG. 9 is a perspective view of the oil filter used in the tensioner of FIGS. 7 and 8.

FIGS. 7 and 8 show an oil tensioner 60 which includes an oil filter 50 disposed in an oil flow path 119 in such a way that it can be easily removed and replaced without detaching the oil tensioner from an engine block or other machine to which it is attached. The oil filter 50, shown in greater detail in FIG. 9, comprises a filter body or frame 51 which is substantially T-shaped in cross-section. The filter screen 52, which is supported in the frame, is a small-mesh net formed from fibers of a synthetic resin such as Tetoron. The oil filter is positioned in path 119, as shown in FIG. 8, through a transverse rectangular passage leading to the outside of the housing 35, so that the filter can be easily removed and replaced. The filter can be quickly removed for inspection, and its presence in proper position in the tensioner can be easily confirmed visually.

The tensioner includes a reservoir 62, and the filter is positioned in path 119 between the reservoir and check valve 114.

In operation of the tensioner of FIGS. 7 and 8, oil O flows through the oil path, generally indicated by reference numeral 134, from the reservoir, through path 119, through the filter 50, and through seat 120 of check valve 114, and past its ball 122 into the expansible chamber formed by bore 115 and piston 113. The ball is held against the seat 120 by a spring 121 supported in a retainer 123. Spring 117 urges the piston against chain C. Oil flows back from the expansible chamber to the reservoir through orifice 116, without again encountering the filter. Foreign substances, such as chips and dust, accumulate on the upper face of the filter screen 52.

Figure 10:
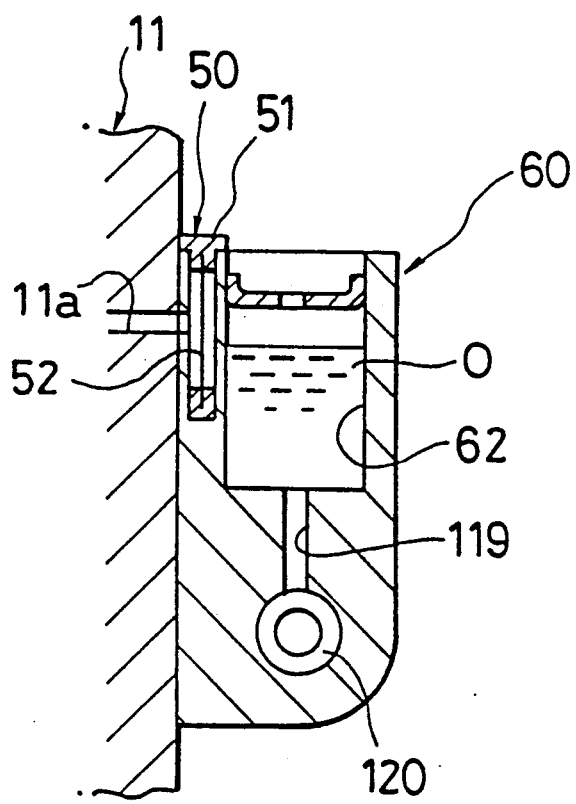
FIG. 10 is a vertical section showing a modification of the tensioner of FIGS. 7 and 8, in which the oil filter is in a different location.

FIG. 10 shows a modification to the oil tensioner of FIGS. 7 and 8, in which the oil filter 50 is disposed between the oil port 11a of the engine block 11 and reservoir 62. The filter removes foreign substances from the oil before the oil reaches the reservoir. Here again, the filter is readily removable without detaching the tensioner housing from the engine block.

It will be apparent to persons skilled in the art that many other modifications and variations can be made to the tensioner herein described without departing from the spirit and scope of the invention as defined in the following claims.

We claim:

1. An oil tensioner in combination with a machine having a wall, an opening in said wall, and an oil passage capable of delivering oil to said opening, said oil tensioner comprising a housing having a cylindrical bore; a piston slidable in said bore, said piston and cylindrical bore providing an expansible chamber capable of containing oil; passage means in said housing providing for the flow of oil in a first direction into said expansible chamber and in a second direction out of said expansible chamber; and check valve means associated with said passage means, for controlling flow of oil in said passage means in at least one of said first and second directions, so that the flow of oil takes place in one of said directions at a slower rate than in the other of said directions; said passage means having an oil-receiving opening in communication with the exterior of the housing, and providing for the flow of oil from the exterior of said housing to said expansible chamber; and said passage means also including a filter chamber; oil filter means, located in said filter chamber, for preventing foreign particles from passing toward said expansible chamber through the portion of said passage means extending between said filter chamber and said expansible chamber; and a wall in said housing adapted to engage a portion of said wall of the machine; in which said filter chamber is provided in part by a recess formed in said wall of the housing and in part by said wall of the machine, said recess having a floor; in which the portion of said passage means extending between said filter chamber and said expansible chamber has an opening in the floor of said recess; in which said opening in said wall of the machine is in communication with said filter chamber; and in which said filter means comprises a screen located within said recess.

2. An oil tensioner in combination with a machine having a wall, an opening in said wall, and an oil passage capable of delivering oil to said opening; said oil tensioner comprising: a housing having a cylindrical bore; a piston slidable in said bore, said piston and cylindrical bore providing an expansible chamber capable of containing oil; passage means in said housing providing for the flow of oil in a first direction into said expansible chamber and in a second direction out of said expansible chamber; and check valve means associated with said passage means, for controlling flow of oil in said passage means in at least one of said first and second directions, so that the flow of oil takes place in one of said directions at a slower rate than in the other of said directions; said passage means having an oil-receiving opening in communication with the exterior of the housing, and providing for the flow of oil from the exterior of said housing to said expansible chamber; and said passage means also including a filter chamber; oil filter means, located in said filter chamber, for preventing foreign particles from passing toward said expansible chamber through the portion of said passage means extending between said filter chamber and said expansible chamber; and a wall in said housing adapted to engage a portion of said wall of the machine; in which said filter chamber is provided in part by a recess formed in said wall of the housing and in part by said wall of the machine, said recess having a floor; in which the portion of said passage means extending between said filter chamber and said expansible chamber has an opening in the floor of said recess; in which said filter means comprises a screen, located within said recess, said screen having an area substantially greater than the largest transverse cross-sectional area of the portion of said passage means extending between said filter chamber and said expansible chamber; and in which said opening in said wall of the machine is offset from said opening in the floor of the recess.

3. An oil tensioner according to claim 2 in which said screen is disposed in said recess with a first portion thereof opposed to said opening in the wall of the machine and with a second portion thereof opposed to said opening in the floor of the recess, and in which said first portion of the screen is spaced from the floor of said recess by a distance less than the spacing of said second portion of the screen from said floor of the recess.

4. An oil tensioner according to claim 2 in which said screen is disposed in said recess with a first portion thereof opposed to said opening in the wall of the machine and with a second portion thereof opposed to said the said opening in the floor of the recess, and in which said screen is disposed in inclined relationship to said wall of the machine and to said floor of the recess whereby said first portion of the screen is spaced from the floor of said recess by a distance less than the spacing of said second portion of the screen from said floor of the recess.

5. An oil tensioner according to claim 2 in which said screen is disposed in said recess with a first portion thereof opposed to said opening in the wall of the machine and with a second portion thereof opposed to said the said opening in the floor of the recess, and in which said screen is disposed in inclined relationship to said wall of the machine and to said floor of the recess whereby said first portion of the screen is spaced from said wall of the machine by a distance greater than the spacing of said first portion of the screen from said floor of the recess, and said second portion of the screen is spaced from said floor of the recess by a distance greater than the spacing of said second portion of the screen from said wall of the machine.

6. An oil tensioner according to claim 2 in which said filter means comprises a frame supporting said screen, said frame being of a size such that it fits into said recess and is held fixed therein between said wall of the machine and said floor of the recess, and in which said screen is disposed in said frame with a first portion thereof opposed to said opening in the wall of the machine and with a second portion thereof opposed to opening of the floor of the recess, and in which said screen is disposed in said frame with said first portion spaced from the floor of said recess by a distance less than the spacing of said second portion of the screen from said floor of the recess.

7. An oil tensioner comprising a housing having a cylindrical bore; a piston slidable in said bore, said piston and cylindrical bore providing an expansible chamber capable of containing oil; passage means in said housing providing for the flow of oil in a first direction into said expansible chamber and in a second direction out of said expansible chamber; and check valve means associated with said passage means, for controlling flow of oil in said passage means in at least one of said first and second directions, so that the flow of oil takes place in one of said directions at a slower rate than in the other of said directions; said passage means having an oil-receiving opening in communication with the exterior of the housing, and providing for the flow of oil from the exterior of said housing to said expansible chamber; and said passage means also including a filter chamber; and oil filter means, located in said filter chamber, for preventing foreign particles from passing toward said expansible chamber through the portion of said passage means extending between said filter chamber and said expansible chamber, in which said oil filter means is removably received in said filter chamber, in which said filter chamber comprises a filter insertion passage leading from said passage means to the exterior of said housing, and in which said filter means comprises a frame slidable into said filter insertion passage from the exterior of said housing, and a filter screen supported in said frame.

8. An oil tensioner according to claim 7 in which said passage means includes an oil reservoir, and in which said filter insertion passage is located in a portion of said passage between said reservoir and said expansible chamber.

9. An oil tensioner according to claim 7 in which the passage means includes an oil reservoir, a first passage leading from said reservoir to said expansible chamber, and a second passage, separate from said first passage, and leading from said expansible chamber to said reservoir, in which said check valve means is in said first passage, and in which said filter insertion passage is located in said first passage between said reservoir and said check valve means.

10. An oil tensioner according to claim 7 in which said passage means includes an oil reservoir, and in which said filter insertion passage is located in a portion of said passage means located between said oil-receiving opening and said reservoir.

11. An oil tensioner according to claim 7 in which the passage means includes an oil reservoir, a first passage leading from said reservoir to said expansible chamber, and a second passage, separate from said first passage, and leading from said expansible chamber to said reservoir, in which said check valve means is in said first passage, and in which said filter insertion passage is located in a portion of said passage means located between said oil-receiving opening and said reservoir.

12. An oil tensioner according to claim 1 in which said screen is disposed in said recess with a first portion thereof opposed to said opening in the wall of the machine and with a second portion thereof opposed to said opening in the floor of the recess, and in which said first portion of the screen is spaced from the floor of said recess by a distance less than the spacing of said second portion of the screen from said floor of the recess.

13. An oil tensioner according to claim 1 in which said screen is disposed in said recess with a first portion thereof opposed to said opening in the wall of the machine and with a second portion thereof opposed to said the said opening in the floor of the recess, and in which said screen is disposed in inclined relationship to said wall of the machine and to said floor of the recess whereby said first portion of the screen is spaced from the floor of said recess by a distance less than the spacing of said second portion of the screen from said floor of the recess.

14. An oil tensioner according to claim 1 in which said screen is disposed in said recess with a first portion thereof opposed to said opening in the wall of the machine and with a second portion thereof opposed to said the said opening in the floor of the recess, and in which said screen is disposed in inclined relationship to said wall of the machine and to said floor of the recess whereby said first portion of the screen is spaced from said wall of the machine by a distance greater than the spacing of said first portion of the screen from said floor of the recess, and said second portion of the screen is spaced from said floor of the recess by a distance greater than the spacing of said second portion of the screen from said wall of the machine.

15. An oil tensioner according to claim 1 in which said filter means comprises a frame supporting said screen, said frame being of a size such that it fits into said recess and is held fixed therein between said wall of the machine and said floor of the recess, and in which said screen is disposed in said frame with a first portion thereof opposed to said opening in the wall of the machine and with a second portion thereof opposed to said the said opening of the floor of the recess, and in which said screen is disposed in said frame with said first portion spaced from the floor of said recess by a distance less than the spacing of said second portion of the screen from said floor of the recess.

16. An oil tensioner according to claim 1 in which said oil filter means is removably received in said filter chamber and in which said filter chamber comprises a filter insertion passage leading from said passage means to the exterior of said housing, and in which said filter means comprises a frame slidable into said filter insertion passage from the exterior of said housing, and a filter screen supported in said frame.

17. An oil tensioner according to claim 16 in which said passage means includes an oil reservoir, and in which said filter insertion passage is located in a portion of said passage between said reservoir and said expansible chamber.

18. An oil tensioner according to claim 16 in which the passage means includes an oil reservoir, a first passage leading from said reservoir to said expansible chamber, and a second passage, separate from said first passage, and leading from said expansible chamber to said reservoir, in which said check valve means is in said first passage, and in which said filter insertion passage is located in said first passage between said reservoir and said check valve means.

19. An oil tensioner according to claim 16 in which said passage means includes an oil reservoir, and in which said filter insertion passage is located in a portion of said passage means located between said oil-receiving opening and said reservoir.

20. An oil tensioner according to claim 16 in which the passage means includes an oil reservoir, a first passage leading from said reservoir to said expansible chamber, and a second passage, separate from said first passage, and leading from said expansible chamber to said reservoir, in which said check valve means is in said first passage, and in which said filter insertion passage is located in a portion of said passage means located between said oil-receiving opening and said reservoir.

* * * * *